United States Patent [19]
Kojima

[11] 4,319,673
[45] Mar. 16, 1982

[54] CONTROL DEVICE FOR A BRAKE AND A DERAILLEUR FOR A BICYCLE

[75] Inventor: Masao Kojima, Sakai, Japan

[73] Assignee: Shimano Industrial Company, Limited, Osaka, Japan

[21] Appl. No.: 79,459

[22] Filed: Sep. 27, 1979

[30] Foreign Application Priority Data

Oct. 6, 1978 [JP] Japan ............................ 53-138288[U]

[51] Int. Cl.³ ...................... B62K 23/06; B62L 3/02; F16D 67/00
[52] U.S. Cl. ...................................... 192/4 R; 74/489
[58] Field of Search ................... 192/4 R; 74/488, 489

[56] References Cited

U.S. PATENT DOCUMENTS

| | | |
|---|---|---|
| 3,633,437 | 1/1972 | Ishida .................................... 74/489 |
| 4,100,820 | 7/1978 | Evett .................................... 192/4 R |
| 4,132,296 | 1/1979 | Evett .................................... 192/4 R |

FOREIGN PATENT DOCUMENTS

| | | |
|---|---|---|
| 1092334 | 4/1952 | Fed. Rep. of Germany . |
| 1183515 | 7/1956 | France . |
| 670122 | 4/1952 | United Kingdom . |

*Primary Examiner*—Allan D. Herrmann
*Attorney, Agent, or Firm*—Stevens, Davis, Miller & Mosher

[57] ABSTRACT

A control device for a brake and a derailleur for a bicycle, in which a fixing member is fixed to a handle bar, to which member a brake lever having a grip is supported swingably through a first pivot and a control lever having at least one control portion for operating a derailleur is supported swingably through a second pivot disposed approximately perpendicularly with respect to the first pivot, the control portion at the control lever being positioned between the handle bar and the grip at the brake lever and made swingable in the direction perpendicular to the swinging direction of the brake lever, so that a driver can operate the derailleur while gripping by his hand the grip of handle bar.

2 Claims, 6 Drawing Figures

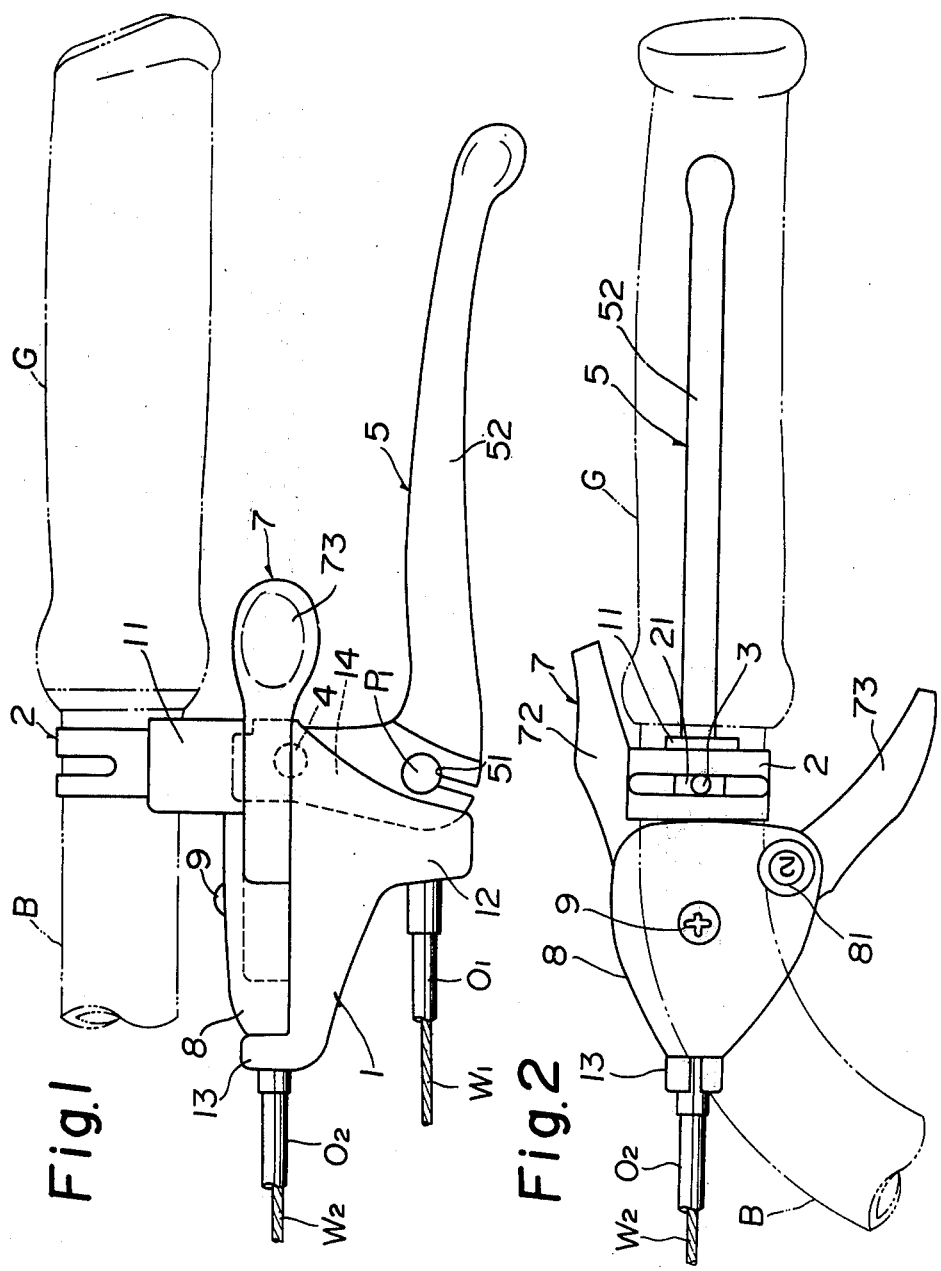

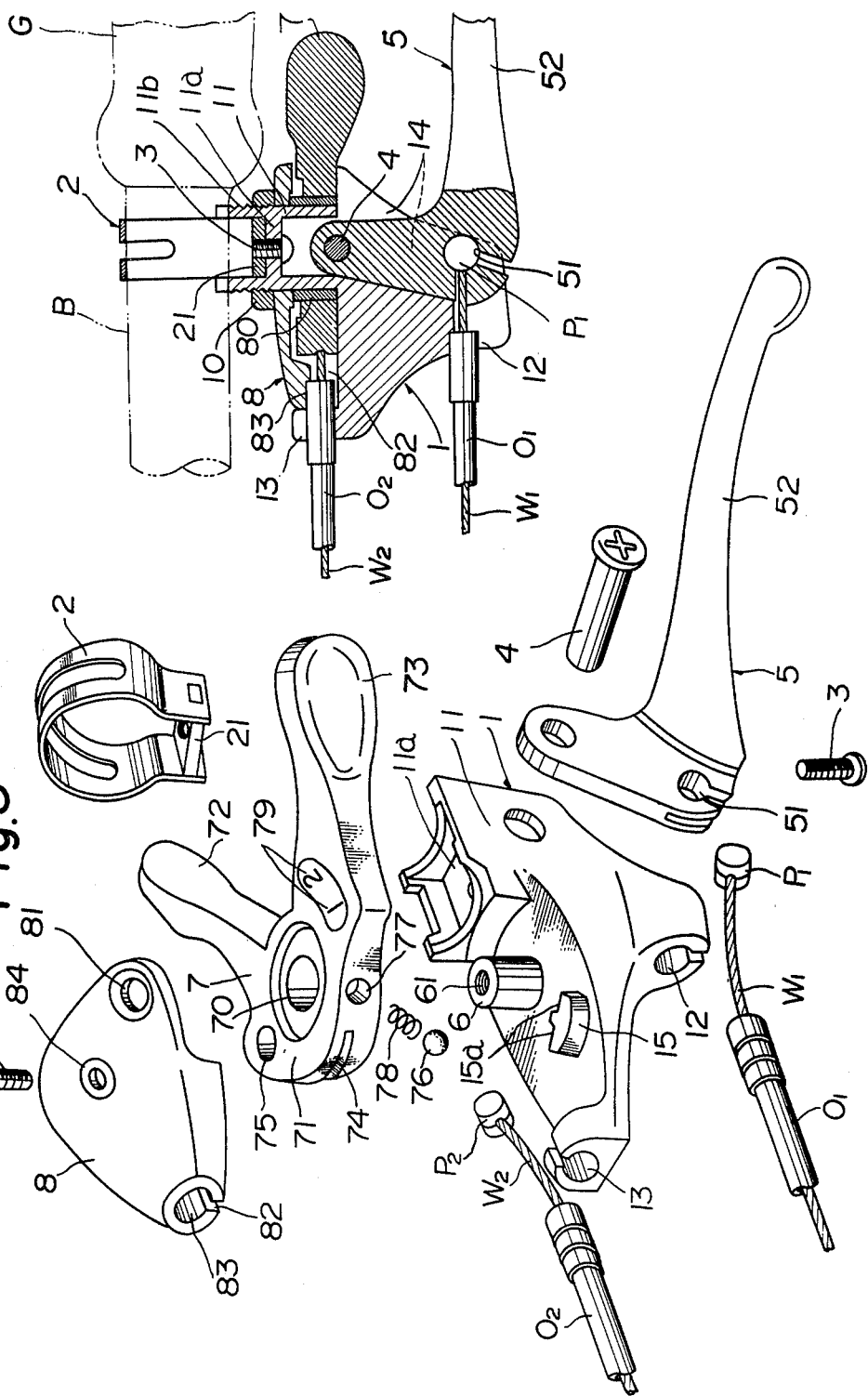

CONTROL DEVICE FOR A BRAKE AND A DERAILLEUR FOR A BICYCLE

BACKGROUND OF THE INVENTION

This invention relates to a control device for a brake and a derailleur for a bicycle, which device is mounted to a handle bar in the vicinity of a grip thereof.

Generally, a control device for the brake is mounted to the handle bar in the vicinity of the grip thereof, and a control device for the derailleur is usually mounted to the bicycle frame, such as a top tube, or the handle bar. The brake control device is controllable by a driver while he is gripping by hand the handle grip, but the derailleur control device is difficult to operate when the deriver is gripping the handle grip. In other words, the derailleur control device, when mounted near the handle grip, is mounted at the opposite side of the handle bar with respect to the brake control which is also mounted near the handle grip. Hence, the driver, when operating the derailleur control with the hand that grips the handle grip, should raise his thumb or forefinger above the handle grip, whereby his palm leaves, at the base of the thumb or forefinger, the handle grip, resulting a loss of grip. In other words, it is difficult to operate the derailleur while gripping the handle grip.

A control device has hitherto been proposed which assembles the brake control device and derailleur control device into one fixing member, namely, a brake lever and a control lever for the derailleur are assembled into one fixing member. The control lever for the derailleur, however, is disposed laterally of the fixing member and pivoted to a pivot extending in the same direction as a pivot for the brake lever. Hence, the driver, as in the previous conventional example, cannot control the control lever when he is positively gripping the handle bar. As a result, the aforesaid problem remains.

In order to overcome the aforesaid problem, the present invention has been designed. An object of the invention is to provide a control device through which the driver can operate the brake lever and control lever as he is gripping the handle bar, in other words, keeping nearly the whole surface of his palm in contact with the handle grip, so that he can operate the control lever not by raising but by merely stretching his thumb or forefinger.

In detail, the control device of the invention is so constructed that a brake lever having a grip is swingably supported through a first pivot to one fixing member fixed to the handle bar, a control lever having at least one control portion for operating the derailleur is supported swingably through a second pivot disposed substantially perpendicularly with respect to the first pivot, and the control portion of the control lever is positioned between the handle bar and the grip of the brake lever and is made swingable in the direction at right angles with the swinging direction of the brake lever, whereby a driver can operate the control lever to actuate the derailleur while keeping his grip on the handle grip.

This invention is characterized in that the control lever is incorporated with the fixing member so that the control portion of the control lever may be positioned between the grip of the brake lever and the handle bar. Accordingly, by use of the control device of the invention, whose fixing member is fixed to the handle bar in the vicinity of the grip thereof, the driver can operate the control lever merely by stretching his thumb or forefinger in a posture of gripping the handle grip. Hence, even when operating the control lever, the driver can retain a firm grip to thereby safely perform the speed change while steering the bicycle through the handle.

Moreover, the control device of the invention, which incorporates the brake lever and control lever with the one fixing member, fixes the fixing member only to the handle bar to keep both the levers in the most suitable position with respect to the handle grip, for always safely and reliably operating the brake and derailleur.

These and other objects and novel features of the invention will be more apparent from the following description in accordance with the accompanying drawings.

BREIF DESCRIPTION OF THE DRAWINGS

FIG. 1 is a side view of an embodiment of the invention,

FIG. 2 is a plan view thereof,

FIG. 5 is a perspective exploded view of the control device of the invention, and FIG. 6 is a longitudinal sectional view of a modified embodiment.

DESCRIPTION OF THE PREFERRED EMBODIMENT

Figure 3:
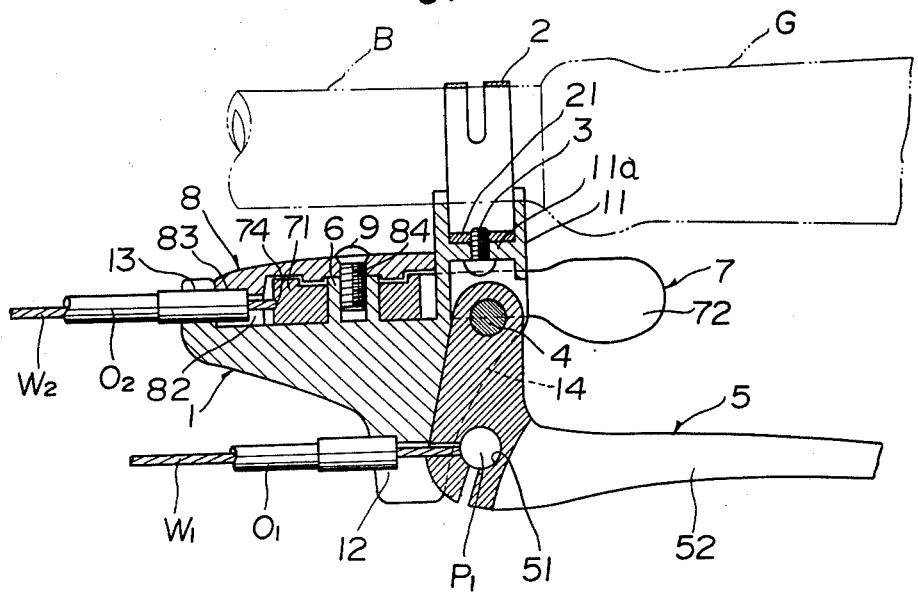
FIG. 3 is a partially omitted longitudinal sectional view of the same.

Referring to the drawings, reference numeral 1 designates a fixing member fixed to a handle bar B near a grip G thereof, and 2 designates a tightening band constituting fixing means for fixing the fixing member 1 to the handle bar B. The fixing member 1 is formed in a block flat at its upper surface and is provided at the rear side, i.e., the grip G side, with an upright portion 11 rising therefrom and at the front side with a holder 12 for an outer sheath $O_1$ guiding a brake wire $W_1$ and with a holder 13 for an outer sheath $O_2$ guiding a control wire $W_2$.

The upright portion 11 is tubular and has at the uppermost end a concave surface through which the same is seated on the outer periphery of handle bar B and in the vicinity of the uppermost end a connector 11a for connecting with the tightening band 2. A bore 14 for receiving therein a brake lever 5 at the root thereof is formed at the fixing member 1. The bore 14 extends from the root of upright portion 11 to the lower surface of fixing member 1, opens rearward thereof, and connects with a space within the upright portion 11. The tightening band 2 is formed in a substantially inverted U-like shape as shown in FIG. 5 and has at the foremost ends a nut 21. A screw bolt 3 perforates through the connector 11a and screws with the nut 21, whereby the tightening band 2 is pulled toward the upright portion 11 and the concave face at the uppermost end of upright portion 11 is pressed onto the handle bar B to thereby fix the fixing member 1 thereto.

Reference numeral 4 designates a first pivot. The first pivot 4 crosses the bore 14 in the vicinity of the root of upright portion 11 and is supported horizontally thereto. Onto the first pivot 4 is pivotally supported the brake lever 5 of a L-like shape as shown in FIG. 5. The brake lever 5 has at its bent portion a bore 51 for retaining a retainer $P_1$ attached to a terminal of the brake wire $W_1$, and has a grip 52 extending horizontally rearward from the bent portion.

The brake lever 5, when grasped at the grip 52 by a driver, swings to allow the end of grip 52 to approach the handle bar B, thereby pulling the brake wire $W_1$ to exert the brake (not shown) attached to the bicycle.

Figure 4:
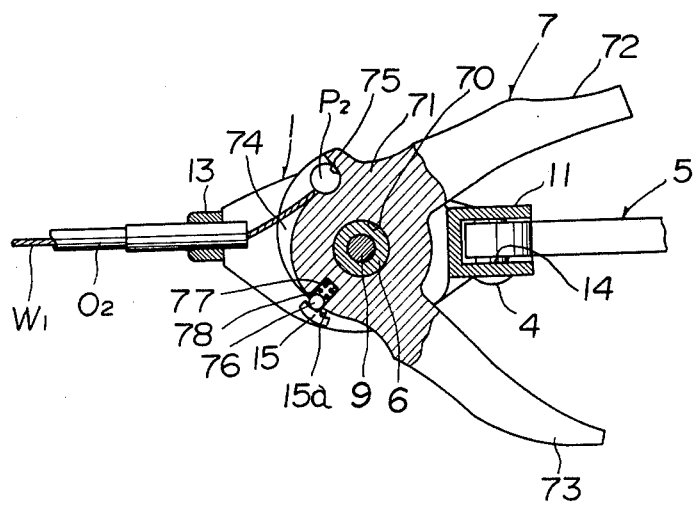
FIG. 4 is a cross-sectional view of a pivot portion of a control lever.

Reference numeral 6 designates a second pivot. The second pivot 6 rises from the horizontal surface of fixing member 1 at the front side of the upright portion 11 and in parallel to the upright portion 11. The second pivot 6 also is perpendicular with respect to the axis of first pivot 4, has at the center a threaded bore 61, and pivotally supports onto the outer periphery a control lever 7 for operating the derailleur (not shown). The control lever 7, as shown in FIGS. 4 and 5, conprises; a boss 71 having a bore 70 through which the second pivot 6 projects, and marks 79 which are provided at the upper surface of the boss 71 near the bore 70 and indicate the speed change stages; and two control bodies or legs 72 and 73 extending outwardly from the outer periphery of the boss 71. The boss 71 has at the outer periphery thereof a guide groove 74 for guiding the control wire $W_2$ and a bore 75 for holding a retainer $P_2$ at a terminal of the wire $W_2$, and carries a ball 76 engageable with engaging portions 15a at an engaging body 15 to be hereinafter described. The ball 76 is inserted into a recess 77 provided at the boss 71, and is supported by a spring 78 housed within the recess 77, thereby being movable into and out of the recess 77.

The engaging body 15 is provided at the horizontal surface of fixing member 1 and has the engaging portions 15a of the number corresponding to the number of the speed change stages and separated at intervals correspondingly thereto. The ball 76 engages with one engaging portion 15a to maintain the control lever 7 in position corresponding to the desired speed change stage.

The control lever 7 is mounted to the fixing member 1 so that the control portions 72 and 73 may be positioned between the grip 52 at the brake lever 5 and the bandle bar B and swing in a direction perpendicular to the swinging direction of the brake lever 5. Hence, the driver can operate the control lever 7 merely by stretching his thumb or forefinger keeping his palm almost entirely on the handle grip G while gripping it with his hand.

In the drawings, reference numeral 8 designates a cover covering the boss 71 at the control lever 7. The cover 8 is provided with a window 81 through which the marks 79 for each speed change stage are readable, and with a guide groove 82 for the control wire $W_2$ and a bore 83 for holding the outer sheath $O_2$. The cover 8 also is mounted to the second pivot 6 by means of a set screw 9 which is inserted through a through bore 84 at the cover 8 and screwed with the second pivot 6.

The control device of the invention constructed as described is, when in use, mounted through the tightening bands 2 to the handle bar B near the grip G thereof and at the most suitable position for controlling the brake lever 5. In this instance, the control portions 72 and 73 at the control lever 7, which are positioned between the grip 52 of brake lever 5 and the handle bar B as described above, are positioned most suitably to be operated by the driver while gripping the handle grip G. Also, the control lever 7 is made horizontally swingable, so that the driver, while gripping the handle grip G, stretches his thumb or forefinger to horizontally push the control portion 72 or 73, whereby the control lever 7 is reliably controllable by this simple operation. During this operation, nearly the entire surface of the driver's palm is in contact with the handle grip G for steering the bicycle in safety. Also, the driver can grasp the grip 52 at the brake lever 5 while gripping the handle grip G to thereby easily exert the brake.

The second pivot 6, other than being intergrated with the fixing member 1 as described in the above embodiment, may be separated from the fixing member 1, or replaced by the cylindrical upright portion 11 as shown in FIG. 6 for pivotally supporting the control lever 7.

When using the fixing member 1 the second pivot 6 as, the cylindrical upright portion 11 is provided at the outer periphery of the upper end thereof with a screw thread 11b, which is screwed with a nut 10 to thereby fix the cover 8 to the fixing member 1. In FIG. 6, a sleeve 80 is inserted onto the upright body 11. In addition, the modified embodiment shown in FIG. 6 only has one control portion at the control lever 7.

The aforesaid embodiments employ the tightening band 2 for fixing the fixing member 1 to the handle bar B. Besides this, the fixing member 1 may be divided into two segments which embrace the handle bar B and are connected by a plurality of bolts, thereby being fixed to the handle bar B. In this instance, both the first and second pivots may be provided at one segment, or the first pivot carrying the brake lever 5 may be mounted to one segment and the second pivot for the control lever 7 to the other.

In addition, the embodiment shown in FIGS. 1 through 5 may employ other fixing means instead of the tightening band 2.

As clearly understood from the aforesaid description, the control device of the invention has the brake lever 5 and control lever 7 supported swingably to the one fixing member 1, allows the first pivot 4 supporting the brake lever 5 to extend perpendicularly with respect to the second pivot 6 supporting the control lever 7, and places the controlling portions of control lever 7 between the grip 52 of brake lever 5 and the handle bar B, whereby the driver can operate the brake lever safely and reliably while gripping the handle grip, and further can operate the control lever easily and safely merely by stretching his thumb or forefinger while gripping the handle grip.

While several embodiments of the invention have been shown and described, the invention is not limited to the specific construction thereof, which is merely exemplary, but is limited solely by the attached claims.

What is claimed is:

1. A control device mounted to a handle bar for a bicycle near a grip of said handle bar so as to control a brake and a derailleur, said control device comprising:
    a fixing member having fixing means attachable to said handle bar, said fixing member having a first pivot and a second pivot disposed substantially perpendicularly with respect to said first pivot, and having around said second pivot a flat surface perpendicularly intersecting the axis of said second pivot, said fixing member having at a handle bar grip side an upright portion connected with said fixing means said second pivot being disposed at the front side of said upright portion;
    a brake lever pivoted to said first pivot and being swingable in the direction of approaching said handle bar, said brake lever having a supporting bore for supporting therethrough a terminal of a brake wire connected to said brake and a grip which is grippable by a driver to swing in the direction of approaching said handle bar and pull said brake wire to exert said brake; and, a control lever pivoted to said second pivot at said fixing member, said control lever having a supporting bore for supporting a terminal of a control wire connected to said derailleur, and a boss having a through bore through which said second pivot projects, said control lever further having two control portions extending outwardly from the outer periphery of said boss, said control portions being positioned at both sides of said upright portion said control portions being positioned between said handle bar and said grip at said brake lever and being swingable in a direction perpendicular to the swinging direction of said brake lever, whereby said control lever is swingable to actuate said derailleur.

2. A control device according to claim 1, wherein said upright portion is cylindrical and has at the utmost end a connecting piece functioning as a fixing means, said fixing member having a receiving bore for receiving therein said brake lever, said receiving bore extending from the base of said upright portion to the outer surface of said fixing member and opening rearward thereof and connecting with a space within said upright portion, said first pivot crossing said receiving bore and being supported in the vicinity of said base of said upright portion.

* * * * *